(12) United States Patent
Kim et al.

(10) Patent No.: US 12,009,536 B2
(45) Date of Patent: Jun. 11, 2024

(54) BATTERY MODULE AND BATTERY PACK INCLUDING SAME

(71) Applicants: HYUNDAI MOTOR COMPANY, Seoul (KR); Kia Corporation, Seoul (KR)

(72) Inventors: Tae Hyuck Kim, Asan-si (KR); Yun Ho Kim, Suwon-si (KR); In Gook Son, Hwaseong-si (KR); Jong Wook Lee, Hwaseong-si (KR); Yeon Man Jeong, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 49 days.

(21) Appl. No.: 17/400,679

(22) Filed: Aug. 12, 2021

(65) Prior Publication Data
US 2022/0123400 A1 Apr. 21, 2022

(30) Foreign Application Priority Data
Oct. 20, 2020 (KR) .......................... 10-2020-0136239

(51) Int. Cl.
*H01M 10/04* (2006.01)
*H01M 10/48* (2006.01)
(Continued)

(52) U.S. Cl.
CPC ..... *H01M 50/204* (2021.01); *H01M 10/0481* (2013.01); *H01M 10/482* (2013.01);
(Continued)

(58) Field of Classification Search
None
See application file for complete search history.

(56) References Cited

U.S. PATENT DOCUMENTS

2014/0113171 A1* 4/2014 Schaefer ........... H01M 10/6555
165/185
2014/0134462 A1* 5/2014 Choi ................... H01M 10/482
429/61
(Continued)

FOREIGN PATENT DOCUMENTS

EP 3079183 A1 10/2016
EP 3651232 A1 5/2020
(Continued)

OTHER PUBLICATIONS

Extended European Search Report issued in related European application No. 21193993.9, dated Feb. 3, 2022 (9 pages).

*Primary Examiner* — Lisa S Park
(74) *Attorney, Agent, or Firm* — Lempia Summerfield Katz LLC

(57) ABSTRACT

A battery module includes: a plurality of battery cells stacked on each other in a first direction and forming a stacked structure; a pair of end plates in surface contact with a first and a second ends of the stacked structure in the first direction; a pair of bus bar assemblies disposed at the first and second ends of the stacked structure in a second direction and bonding electrodes of the battery cells; a first cover covering a surface of the stacked structure in a third direction; a first clamp including a first and a second ends respectively bonded to the pair of end plates across an outer surface of the first cover; and a second clamp including a first and a second ends respectively bonded to the pair of end plates across a surface, facing a surface on which the first cover is disposed, of the stacked structure.

16 Claims, 16 Drawing Sheets

(51) Int. Cl.
*H01M 10/613* (2014.01)
*H01M 10/6556* (2014.01)
*H01M 50/204* (2021.01)
*H01M 50/507* (2021.01)
*H01M 50/519* (2021.01)

(52) U.S. Cl.
CPC ....... *H01M 10/486* (2013.01); *H01M 10/613* (2015.04); *H01M 10/6556* (2015.04); *H01M 50/507* (2021.01); *H01M 50/519* (2021.01)

(56) References Cited

U.S. PATENT DOCUMENTS

| | | | |
|---|---|---|---|
| 2016/0336563 A1* | 11/2016 | Choi | H01M 50/291 |
| 2017/0054116 A1* | 2/2017 | Morisaku | H01M 50/20 |
| 2020/0067040 A1* | 2/2020 | Kim | H01M 10/482 |
| 2020/0152931 A1 | 5/2020 | Kim et al. | |
| 2021/0036270 A1* | 2/2021 | Motohashi | H01M 10/647 |

FOREIGN PATENT DOCUMENTS

| | | |
|---|---|---|
| KR | 10-2012-0062260 | 6/2012 |
| KR | 10-2019-0124368 | 11/2019 |

* cited by examiner

BATTERY MODULE AND BATTERY PACK INCLUDING SAME

CROSS REFERENCE TO RELATED APPLICATION

This application claims priority to and the benefit of Korean Patent Application No. 10-2020-0136239, filed on Oct. 20, 2020, the entire contents of which are incorporated herein by reference.

FIELD

The present disclosure relates to a battery module and a battery pack including the battery module.

BACKGROUND

The statements in this section merely provide background information related to the present disclosure and may not constitute prior art.

In line with recent global trends toward carbon dioxide emission reduction, there has been an increasing demand for electric cars that produce traveling power by driving motors with electric energy stored in energy storage devices (for example, batteries), instead of conventional cars having internal combustion engines to produce traveling power by means of combustion of fossil fuel.

The performance of an electric car heavily depends on the capacity and performance of the energy storage device (for example, battery) for storing electric energy to be supplied to the driving motor.

Vehicle batteries for storing electric energy to be supplied to motors to produce traveling power for the vehicles need to have not only excellent electric characteristics (for example, excellent charging/discharging performance and long service life), but also high-level mechanical performances (for example, robustness against harsh vehicle traveling environments, such as high temperatures and severe vibrations).

In addition, it is advantageous in terms of vehicle manufacturers to configure battery hardware in the form of modules having a standardized size or capacitance such that the same can be consistently applied to various kinds of vehicles.

The above descriptions regarding background arts are only for helping understanding of the background of the present disclosure, and are not to be considered by a person skilled in the art as corresponding to already-known prior arts.

SUMMARY

The present disclosure to provide a battery module having a size and a capacity standardized such that the same can be consistently applied to various kinds of vehicles, and a battery pack including the battery module.

In one form, the present disclosure provides a battery module including: a plurality of battery cells stacked on each other in a first direction and forming a stacked structure; a pair of end plates being in surface contact with a first end and a second end of the stacked structure in the first direction; a pair of bus bar assemblies disposed at the first and second ends of the stacked structure in a second direction perpendicular to the first direction and bonding electrodes of the plurality of battery cells respectively disposed at the first and second ends of the stacked structure in the second direction; a first cover covering a surface of the stacked structure in a third direction perpendicular to the first direction and the second direction; a first clamp including a first end and a second end respectively bonded to the pair of end plates across an outer surface of the first cover; and a second clamp including a first end and a second end respectively bonded to the pair of end plates across a surface, which faces a surface on which the first cover is disposed, of the stacked structure.

In one form of the present disclosure, the battery module may further include a second cover and a third cover respectively covering the pair of bus bar assemblies in the second direction.

In one form of the present disclosure, the stacked structure may include a plurality of cell assemblies including a pair of battery cells stacked with a surface pressure pad disposed therebetween, and the cell assemblies may be stacked in the first direction.

In one form of the present disclosure, the battery cells of the cell assemblies may be stacked such that electrodes having the same polarity are disposed adjacent to each other.

In one form of the present disclosure, the cell assemblies of the stacked structure may be stacked such that electrodes having difference polarities are adjacent to each other.

In one form of the present disclosure, the cell assemblies may be stacked with a hot melt disposed therebetween.

In one form of the present disclosure, the pair of end plates each may include an inner plate made of an insulating material and being in surface contact with the stacked structure and an outer plate covering the inner plate and having rigidity larger than rigidity of the inner plate.

In one form of the present disclosure, the outer plate may be formed to be spaced apart at a predetermined distance from the stacked structure at an end adjacent to the first cover, whereby an insertion space for inserting a temperature sensor is defined.

In one form of the present disclosure, the bus bar assembly may have bus bars having a plurality of slits, and the electrodes of the battery cells may be bonded to the bus bars by bending regions passing through the slits.

In one form of the present disclosure, the bus bar assembly may include a circuit detecting voltages of the battery cells.

In one form of the present disclosure, the first clamp may be attached to the first cover, and both ends of the first clamp may be bent to face the pair of end plates and bonded to outer surfaces of the end plates.

In one form of the present disclosure, both ends of the second clamp may be bent to face the pair of end plates and bonded to outer surfaces of the end plates.

In another form, the present disclosure provides a battery pack including: a battery module including a plurality of battery cells stacked on each other in a first direction and forming a structure, a pair of end plates being in surface contact with a first end and a second end of the stacked structure in the first direction, a pair of bus bar assemblies disposed at the first and second ends of the stacked structure in a second direction perpendicular to the first direction and bonding electrodes of the battery cells respectively disposed at the first and second ends of the stacked structure in the second direction, a first cover covering a surface of the stacked structure in a third direction perpendicular to the first direction and the second direction, a first clamp including a first end and a second end respectively bonded to the pair of end plates across an outer surface of the first cover, and a second clamp including a first end and a second end respectively bonded to the pair of end plates across a surface, which faces a surface on which the first cover is disposed, of the stacked structure; a case including a seat surface on which the battery module is seated; and a gap filler disposed between the stacked structure and the seat surface, wherein the stacked structure is exposed through a surface of the battery module facing a surface on which the first cover is disposed and the battery module is disposed such that the exposed stacked structure and the seat surface face each other In one form of the present disclosure, the case may further include a cooling channel, through which cooling water flows, under the seat surface.

According to the battery module and the battery pack including the same, clamps are welded to end plates at both sides at the center of battery module in the direction in which battery cells are stacked, and the end plates are bolted to covers at both ends, whereby it is possible to provide sufficient rigidity.

In addition, according to the battery module and the battery pack including the same, since it is possible to form electrical connection between electrodes of a plurality of stacked battery cells through one bending process and one welding process by employing bus bar assemblies, it is possible to improve the quality of the product by simplifying processes and removing resultant differences between battery cells.

In addition, according to the battery module and the battery pack including the same, since the battery cells forming the battery pack are manufactured in a module type, it is possible to apply standardized battery cells to battery packs having several specifications even if the specification of a battery pack is changed in accordance with the kinds of vehicles. Accordingly, it is possible to remove a specific designing process for disposing battery cells in a battery pack, so it is possible to reduce the development period and the development cost.

In addition, according to the battery module and the battery pack including the same, since the battery cells in the battery module can be in contact with the seat surface of the case of the battery pack through the gap filler without any interference, it is possible to more effectively discharge the heat generated by the battery cells.

Advantageous effects obtainable from the present disclosure are not limited to those mentioned above, and other advantageous effects not mentioned herein could be clearly understood by those skilled in the art to which the present disclosure pertains.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
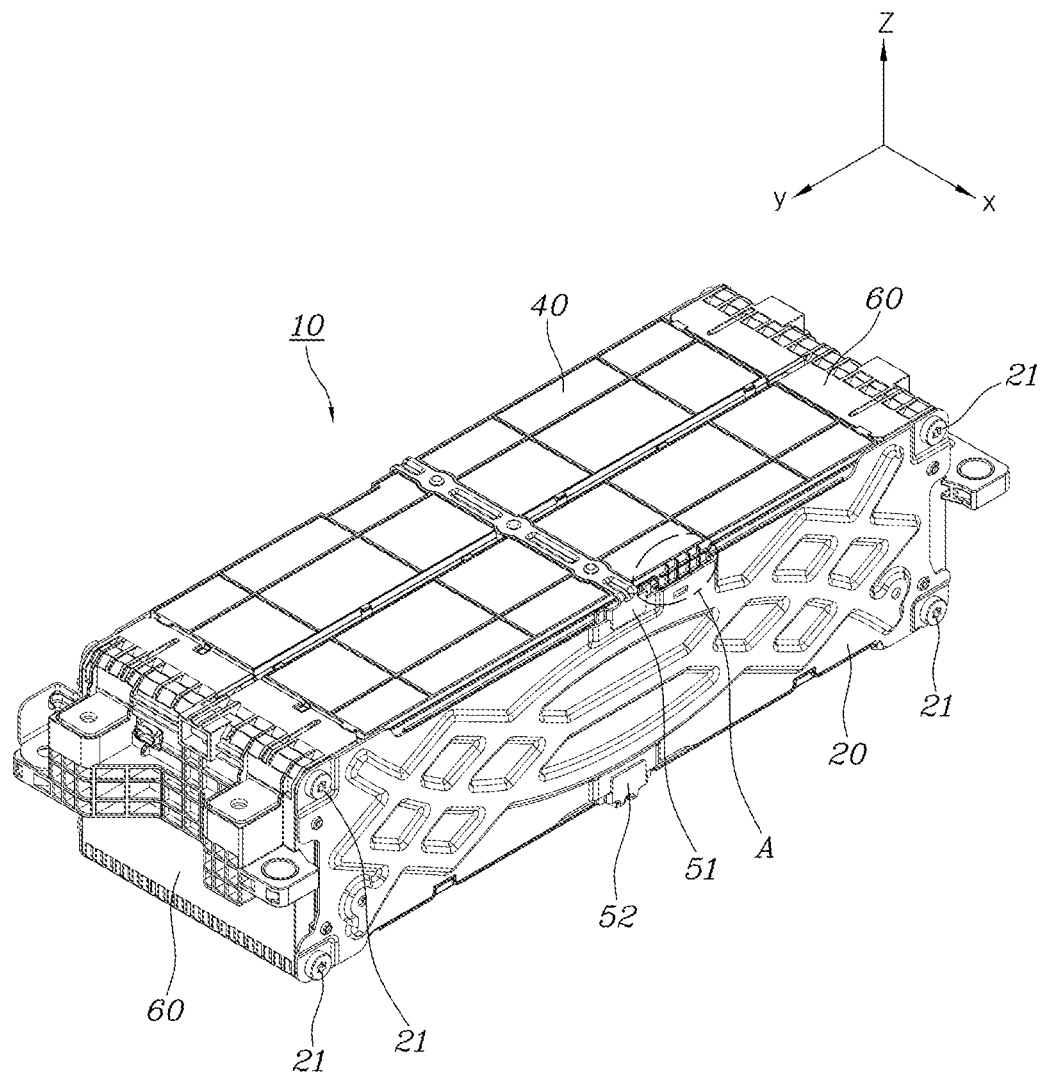
FIG. 1 is a perspective view of a battery module according to one form of the present disclosure seen from above.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereafter, a battery module according to various forms and a battery pack including the battery module are described in detail with reference to the accompanying drawings.

Figure 2:
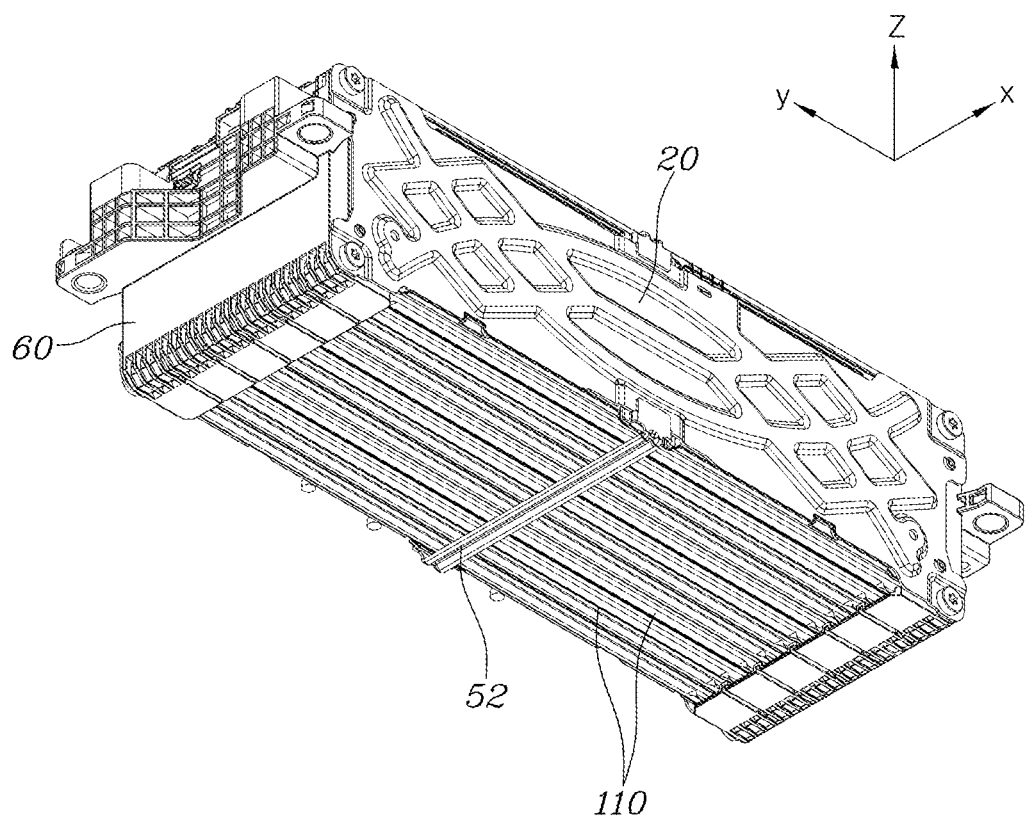
FIG. 2 is a perspective view of the battery module shown in FIG. 1 seen from the bottom.
Figure 3:
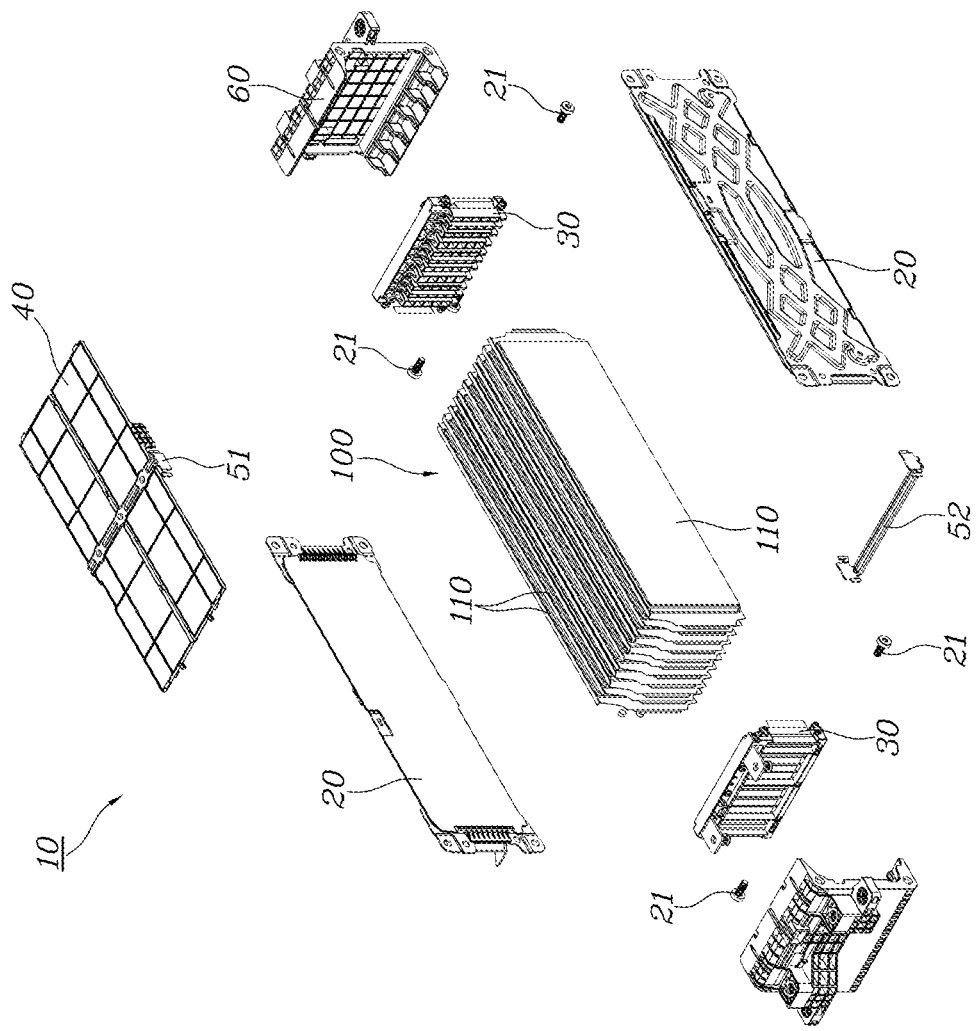
FIG. 3 is an exploded perspective view of the battery module shown in FIG. 1.

FIG. 1 is a perspective view of a battery module according to one form of the present disclosure seen from above, FIG. 2 is a perspective view of the battery module shown in FIG. 1 seen from the bottom, and FIG. 3 is an exploded perspective view of the battery module shown in FIG. 1.

Referring to FIGS. 1 to 3, a battery module 10 according to one form of the present disclosure may include: a plurality of battery cells 110 stacked on each other in a first direction (x-axial direction); a pair of end plates 20 being in surface contact with both ends in the first direction of a structure 100 of the stacked battery cells 110; a pair of bus bar assemblies 30 disposed on both ends in a second direction (y-axial direction) perpendicular to the first direction of the structure 100 of the stacked battery cells 110 and bonded to electrodes of the battery cells 110; a first cover 40 covering a surface of the structure 100 of the stacked battery cells 110 in a third direction (z-axial direction) perpendicular to the first direction and the second direction; a first clamp 51 having both ends respectively bonded to the pair of end plates 20 across the first cover 40 from the outside of the first cover 40; and a second clamp 52 having both ends respectively bonded to the two end plates 20 across the surface, which faces the surface on which the first cover 40 is disposed, of the structure 100 of the stacked battery cells 110.

Further, the battery module according to one form of the present disclosure may include a second cover and a third cover 60 covering the structure 100 of the stacked battery cells 110 respectively outside the bus bar assemblies 30 in the second direction.

Figure 4:
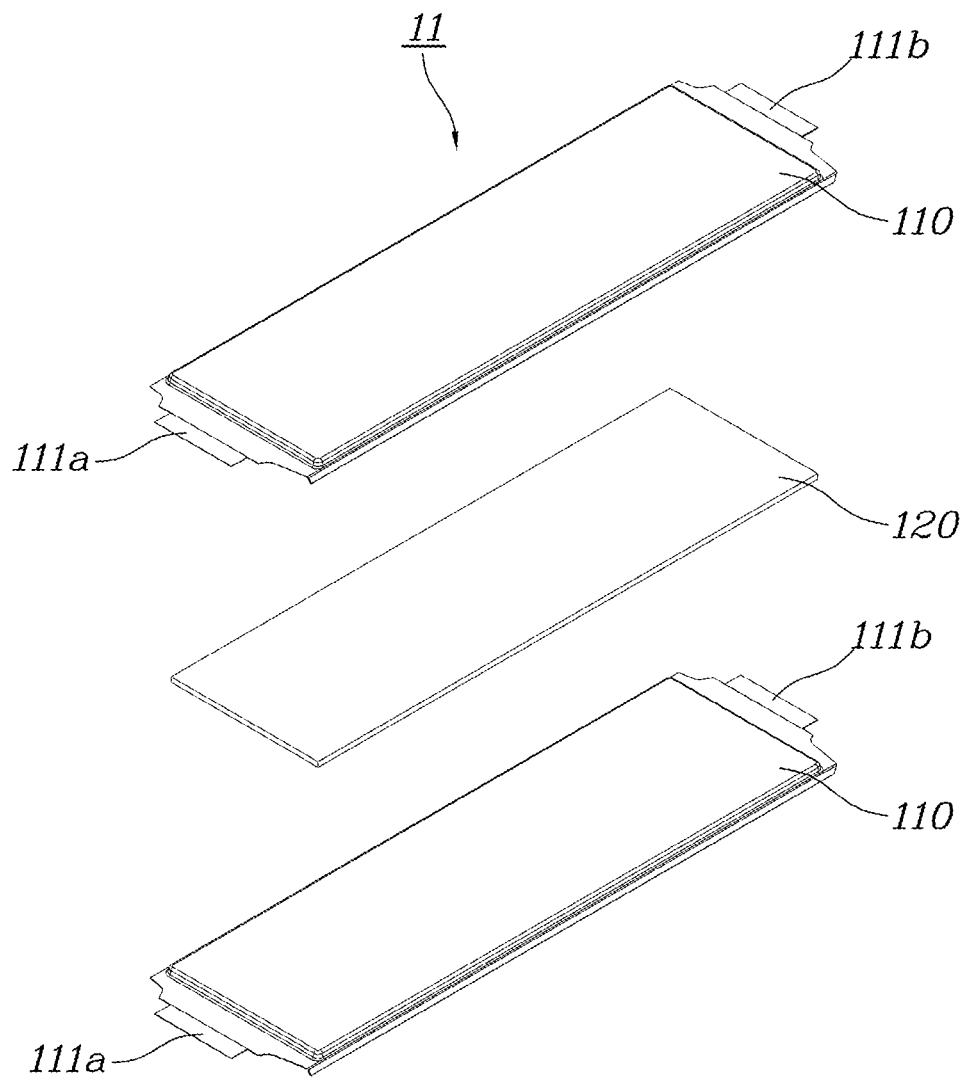
FIG. 4 is a perspective view showing the structure of a cell assembly in a battery module according to one form of the present disclosure.
Figure 5:
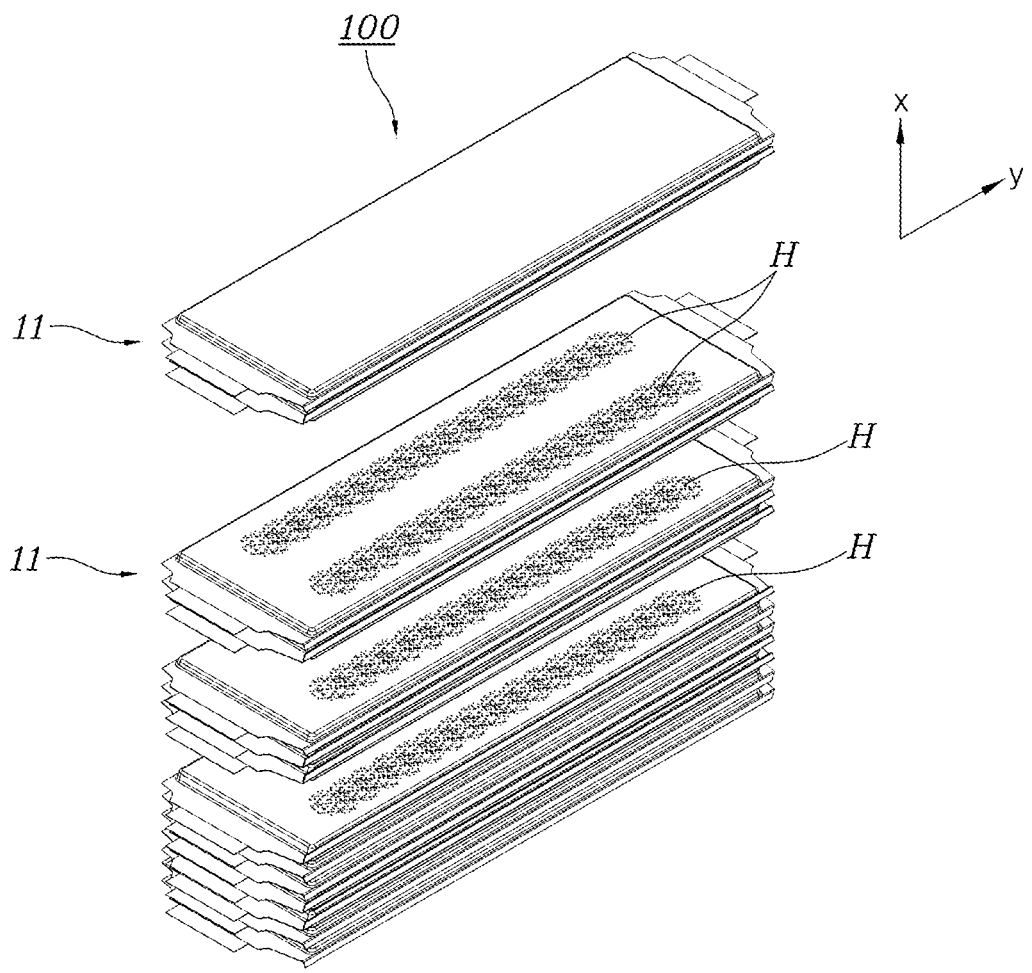
FIG. 5 is a perspective view showing the structure of a battery cell-stacked structure in a battery module according to one form of the present disclosure.

FIG. 4 is a perspective view showing the structure of a cell assembly in a battery module according to one form of the present disclosure and FIG. 5 is a perspective view showing the structure of a battery cell-stacked structure in a battery module according to one form of the present disclosure.

The structure formed by stacking a plurality of battery cells 110, as shown in FIG. 4, may include a cell assembly 11 including two battery cells 110 and a surface pressure pad 120 disposed therebetween by stacking one battery cell 110, the surface pressure pad 120, and the other battery cell 110 on each another. That is, the stacked structure 100 can be manufactured by stacking a plurality of cell assemblies 11 shown in FIG. 4, as shown in FIG. 5.

The battery cells 110 may be disposed in one battery cell assembly 11 such that electrodes having the same polarity (e.g., positive electrodes 111*a* or negative electrodes 111*b*) are adjacent to each other.

The surface pressure pad 120 is a component for inhibiting deformation of the structure of a module by providing elasticity when the battery cell 110 swells.

The cell assemblies 11 may be stacked with a hot melt H therebetween. The hot melt H, which is a kind of liquid-state adhesives that shows adhesion when heat is applied, may be applied to the surfaces of the battery cells 110 in a predetermined pattern when the cell assemblies 11 are stacked on each other so that desired position relationships are achieved between the battery cells by arranging the stacked battery cells and applying heat one time after the cell assemblies 11 are stacked.

The cell assemblies 11 may be stacked such that electrodes having different polarities are adjacent to each other in the stacked structure. This is for implementing an electrical series connection relationship between cell assemblies when bus bars of bus bar assemblies 30 and the electrodes of the battery cells are connected, which will be described below. That is, the battery cells in the cell assemblies 11 form an electrical series connection relationship to each other and electrical series connection relationship may be implemented between the cell assemblies 11.

Hereafter, for the convenience of description, the direction in which the battery cells 110 are stacked in referred to as the first direction (x-axial direction) and the direction perpendicular to the first direction in which the electrodes of the battery cells 110 are connected is referred to as a second direction (y-axial direction). Further, the direction that is perpendicular to the first direction and the second direction, that is, the direction in which sides without an electrode of the battery cells 110 are connected is referred to as the third direction (z-axial direction).

Figure 6:
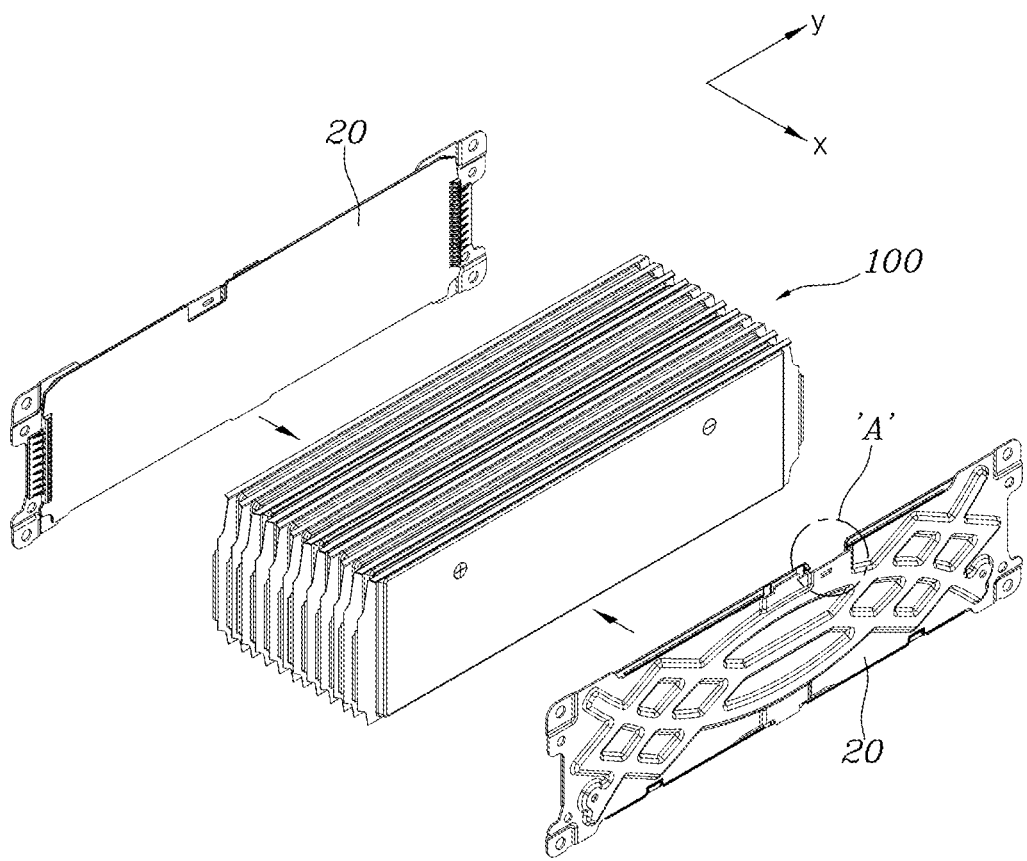
FIG. 6 is a perspective view showing the position relationship of an end plate and a structure of stacked battery modules according to one form of the present disclosure.

FIG. 6 is a perspective view showing the position relationship of an end plate and a structure of stacked battery modules according to one form of the present disclosure.

As shown in FIG. 6, a pair of end plates 20 may be disposed in surface contact with the surfaces at both ends in the first direction that is the stacking direction of the battery cell-stacked structure 100, that is, the exposed surfaces of the outermost battery cells of the battery cells 110 of the stacked structure 100.

The end plates 20 are components that maintain the distance therebetween, thereby inhibiting deformation of the battery module with their rigidity and maintaining the surface pressure between the stacked battery cells 110 when the battery cells 110 swell. Accordingly, the end plates 20 have to have sufficient rigidity that can maintain surface contact with the battery cells 110 and can inhibit deformation of the battery module, and an additional component for uniform surface pressure may be provided.

Figure 7:
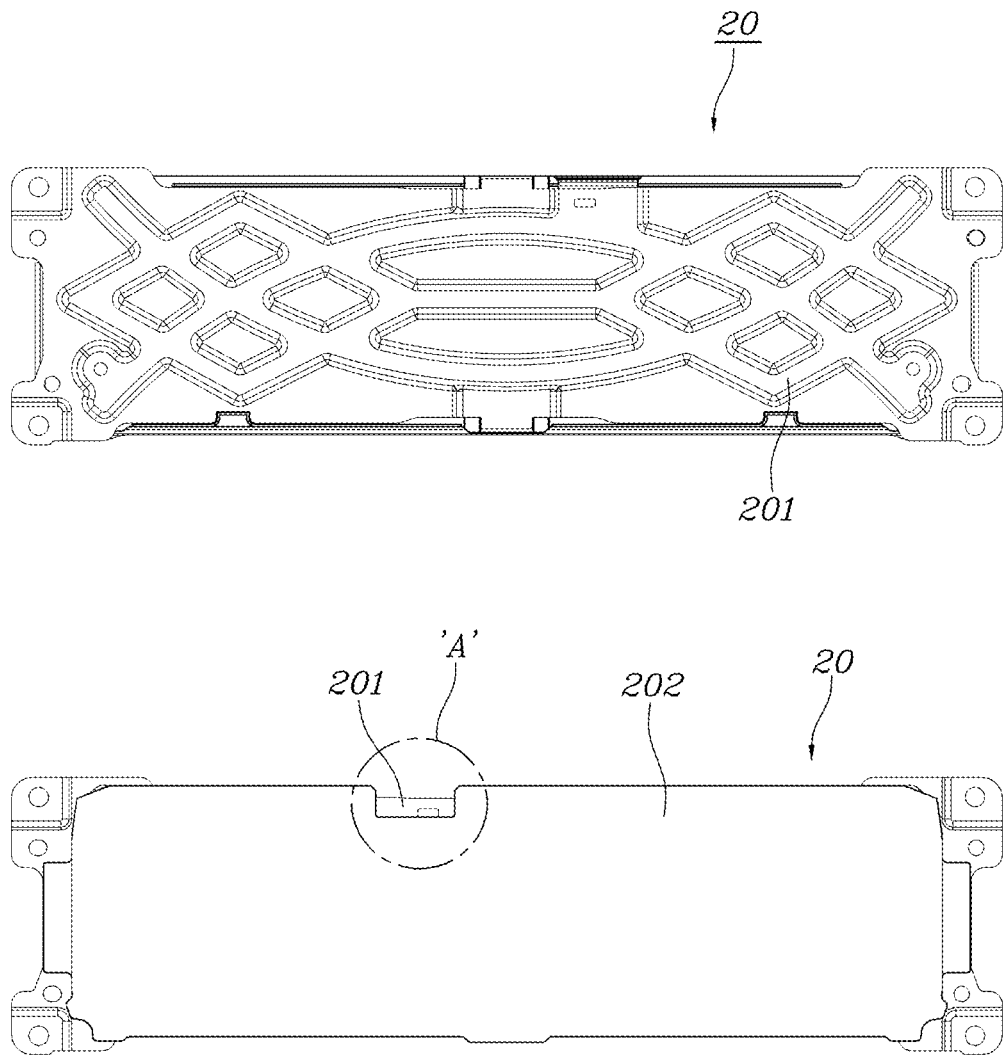
FIG. 7 is a plan view enlarging the outer surface and the inner surface of the end plate shown in FIG. 6.

FIG. 7 is a plan view enlarging the outer surface and the inner surface of the end plate shown in FIG. 6.

As shown in FIG. 7, the end plates 20 each may include an outer plate 201 exposed to the outside of the battery module 10 and an inner plate 202 covered with the outer plate 201 and being in surface contact with the battery cell-stacked structure 100. The outer plate 201 may be made of metal such as aluminum so that sufficient rigidity can be provided and the weight can be reduced, and the inner plate 202 may be made of an insulating material such as plastic that is smaller in rigidity than the outer plate 201 but can provide electrical insulation when it comes in surface contact with the outermost battery cell of the stacked structure 100.

Figure 8:
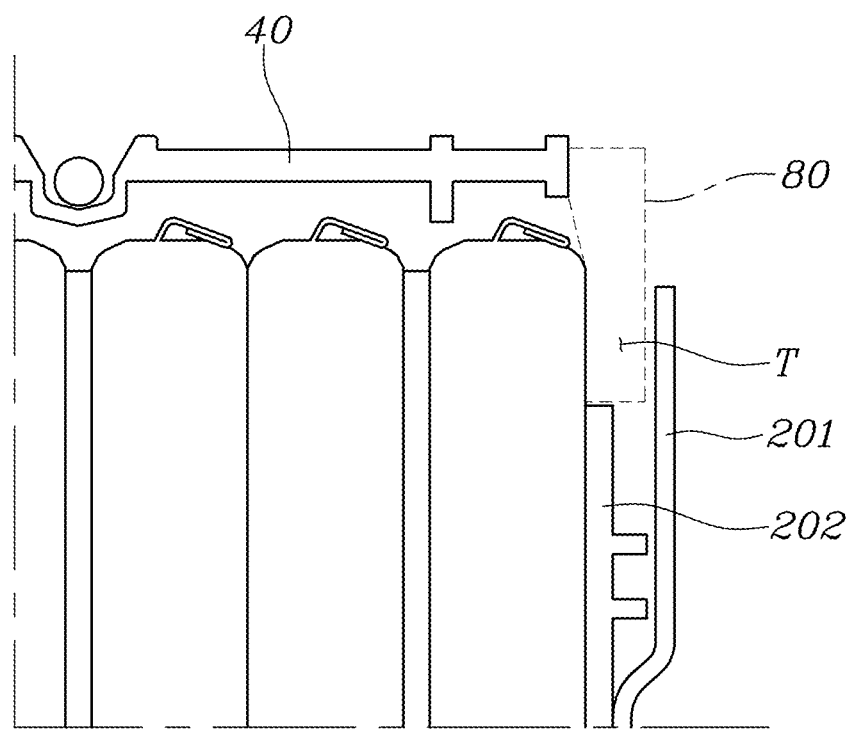
FIG. 8 is a partial cross-sectional view showing in more detail an insertion space defined in the outer plate shown in FIG. 7.

FIG. 8 is a partial cross-sectional view showing in more detail an insertion space defined in the outer plate shown in FIG. 7.

In one form of the present disclosure, an insertion space T in which a temperature sensor 80 spaced a predetermined distance from the stacked structure 100 can be inserted may be defined at the side positioned in the second direction of the outer plate 201 of the end plate 20 by various metal forming techniques. The region in which the insertion space T is defined is the portion indicated by reference character 'A' in FIGS. 1, 6, and 7, and FIG. 8 is a cross-sectional view of the region corresponding to 'A' cut in the first direction.

One battery pack can be implemented by disposing a plurality of battery modules 10 according to one form of the present disclosure in cases designed for the kinds of vehicles. In order to manage a battery pack, it is very important to know the interior temperature and battery modules are usually manufactured with a temperature sensor disposed in the battery module. A battery module according to one form of the present disclosure is characterized in that a temperature sensor is not disposed in the module itself, and a space T in which a temperature sensor can be installed is provided after a plurality of battery modules is disposed in a case.

In particular, in the battery module 10 according to one form of the present disclosure, battery cells are exposed without a specific covering member on the surface facing the surface on which the first cover 40 is disposed, and the surface through which the battery cells are exposed faces the bottom of the case. Accordingly, the insertion space T for a temperature sensor may be defined such that a predetermined space is secured between the outer plate 201 and the battery cell-stacked structure at the end adjacent to the first cover 40 of the outer plate 201.

Figure 9:
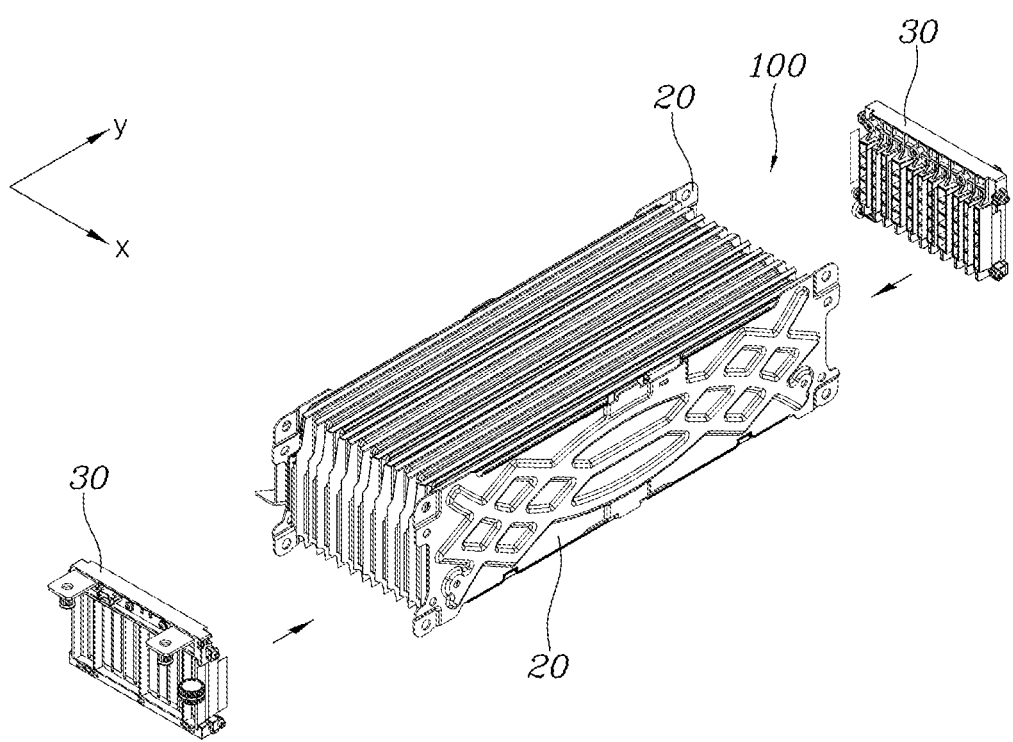
FIG. 9 is a perspective view showing the position relationship of a bus bar assembly and a structure of stacked battery module according to one form of the present disclosure.

FIG. 9 is a perspective view showing the position relationship of a bus bar assembly and a stacked structure of battery modules according to one form of the present disclosure.

As shown in FIG. 9, the bus bar assemblies 30 may be disposed at both ends of the stacked structure 100 in the second direction perpendicular to the stacking direction of the battery cell-stacked structure 100, that is, in the direction in which the electrodes 111a, 111b of the battery cells 110 are connected.

The bus bar assemblies 30 are components having bus bars for electrical connection between the electrodes 111a, 111b of the battery cells 110 in the stacked structure 100.

Figure 10:
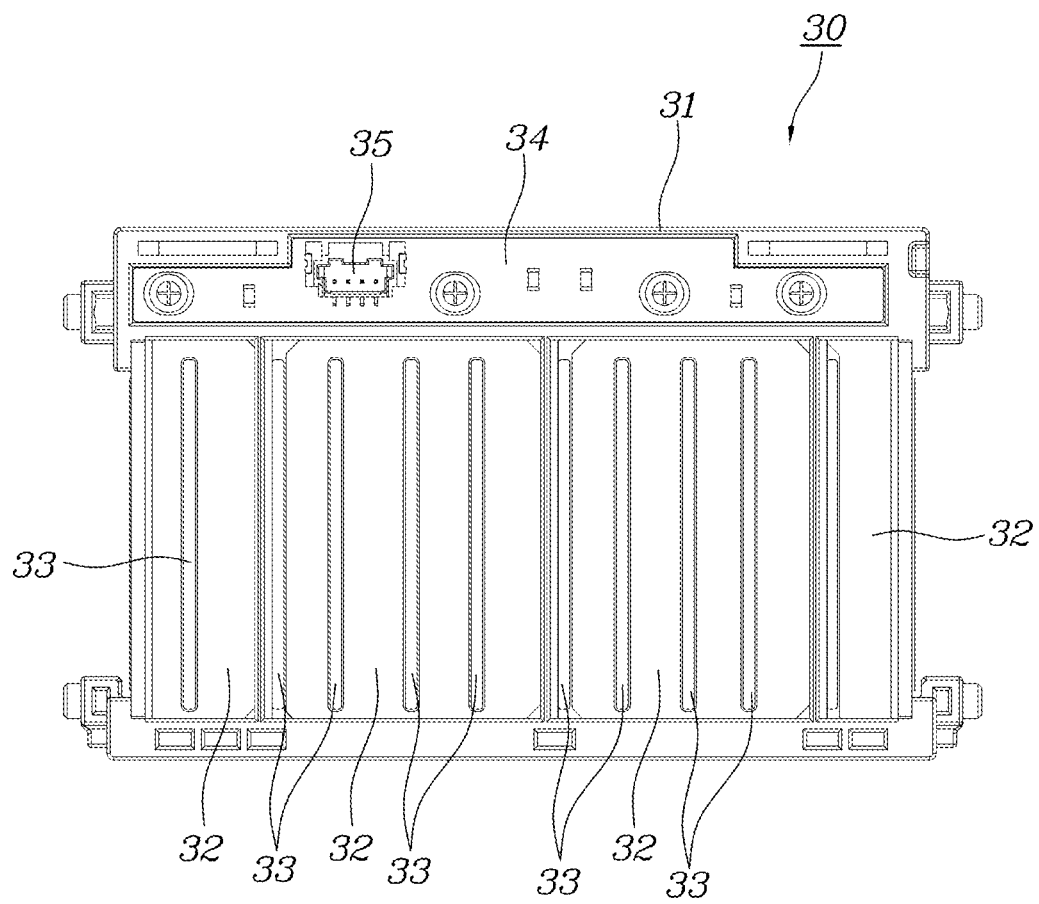
FIG. 10 is a plan view enlarging a bus bar assembly applied to a battery module according to one form of the present disclosure.
Figure 11:
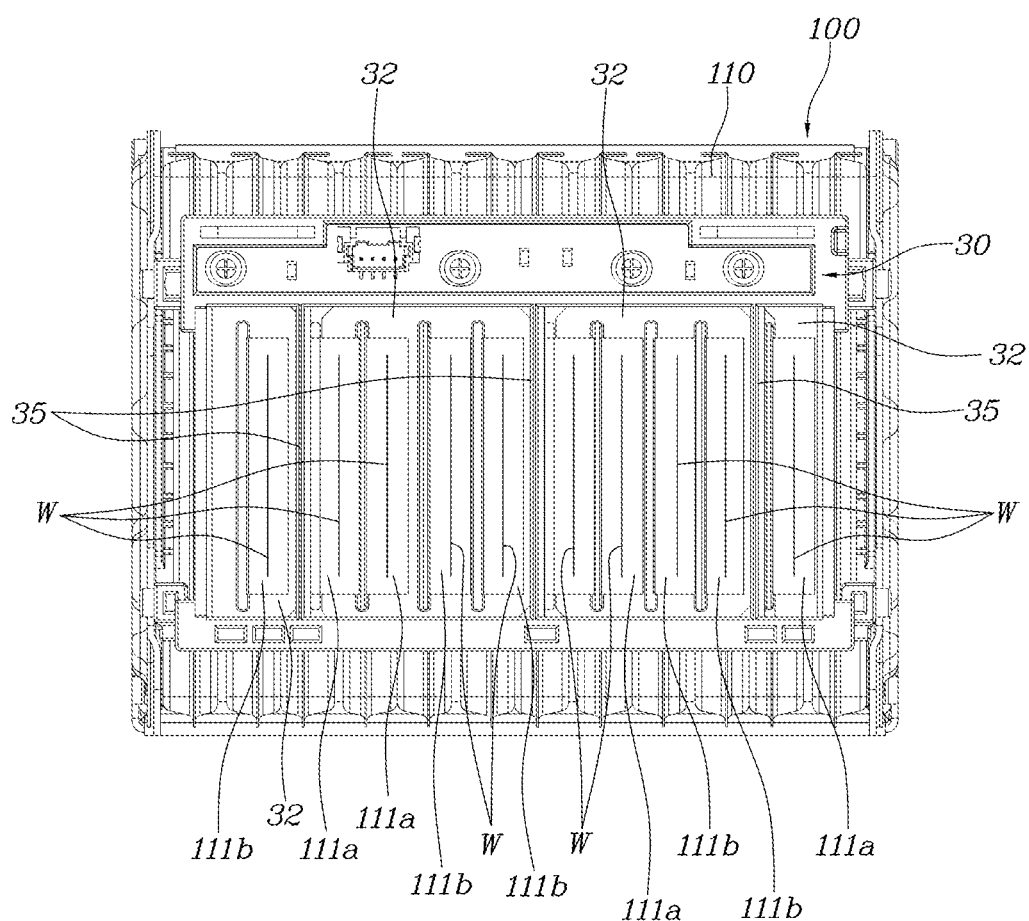
FIG. 11 is a plan view showing the state in which bus bars of the bus bar assembly shown in FIG. 10 and electrodes of battery cells in a stacked structure are bonded.

FIG. 10 is a plan view enlarging a bus bar assembly applied to a battery module according to one form of the present disclosure and FIG. 11 is a plan view showing the state in which bus bars of the bus bar assembly shown in FIG. 10 and electrodes of battery cells in a stacked structure are bonded.

As shown in FIG. 10, the bus bar assembly 30 may include a frame 31 made of an insulating material such as plastic, and bus bars 32 attached to the frame 31 and having slits 33 in which the electrodes 111a, 111b of the battery cells 110 can be inserted. The gaps between the slits 33 may be gaps corresponding to the gaps between the electrodes 111a, 111b of the battery cells 110 disposed in the stacked structure 100. The frame 31 may have partition walls 35 formed between bus bars supposed to be electrically insulated from each other.

The bus bar assembly 30 may include a circuit 34 for monitoring the voltage of the battery cells 110 in a battery module. The circuit 34 may be implemented to include a circuit board such as a PCB and electric elements mounted on the circuit board.

As shown in FIG. 11, when the electrodes 111a, 111b of the battery cells 110 are inserted in the slits 33 formed at the bus bars 32 of the bus bar assembly 30, it is possible to couple the bus bars 32 and the electrodes 111a, 111b of the battery cells 110 to each other by bending all the electrodes 111a and 111b of the battery cells 110 one time to come in contact with the bus bars 32 and then welding them one time. In FIG. 11, reference character 'W' indicates a region irradiated by welding energy for welding.

According to battery modules in the related art, a method of implementing electrical connection of a battery cell-stacked structure by bending the electrodes of unit battery cells in advance, performing primary welding, stacking a plurality of battery cells again, and then performing secondary welding is applied. Such a method in the related art has disadvantages that not only bending and welding are performed several times, but also steps are formed on the welded objects in the secondary welding because it is difficult to provide uniformity.

However, as shown in FIG. 9, according to one form of the present disclosure, it is possible to electrically connect all battery cells in a battery module through one bending process and one welding process by applying the bus bar assembly 30, whereby it is possible to simplify the processes and improve the quality of the product.

Figure 12:
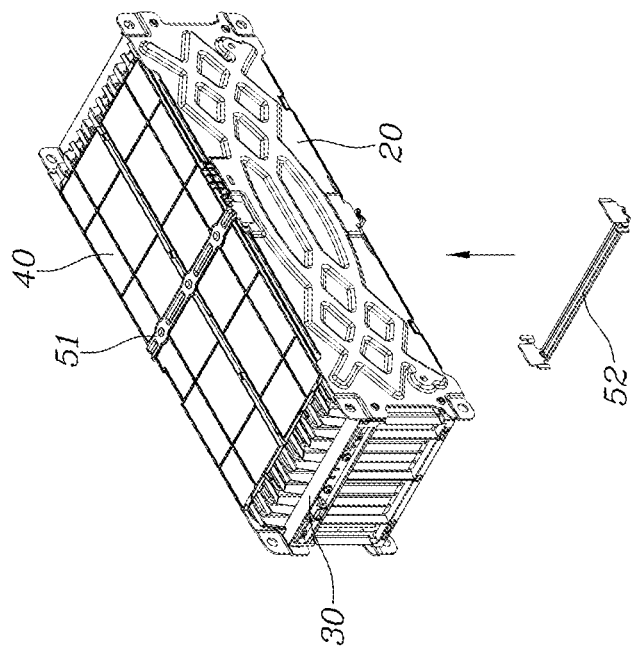
FIG. 12 is a perspective view showing the position relationship of a stacked structure and a cover, a first clamp, and a second clamp of a battery module according to one form of the present disclosure.
Figure 12:
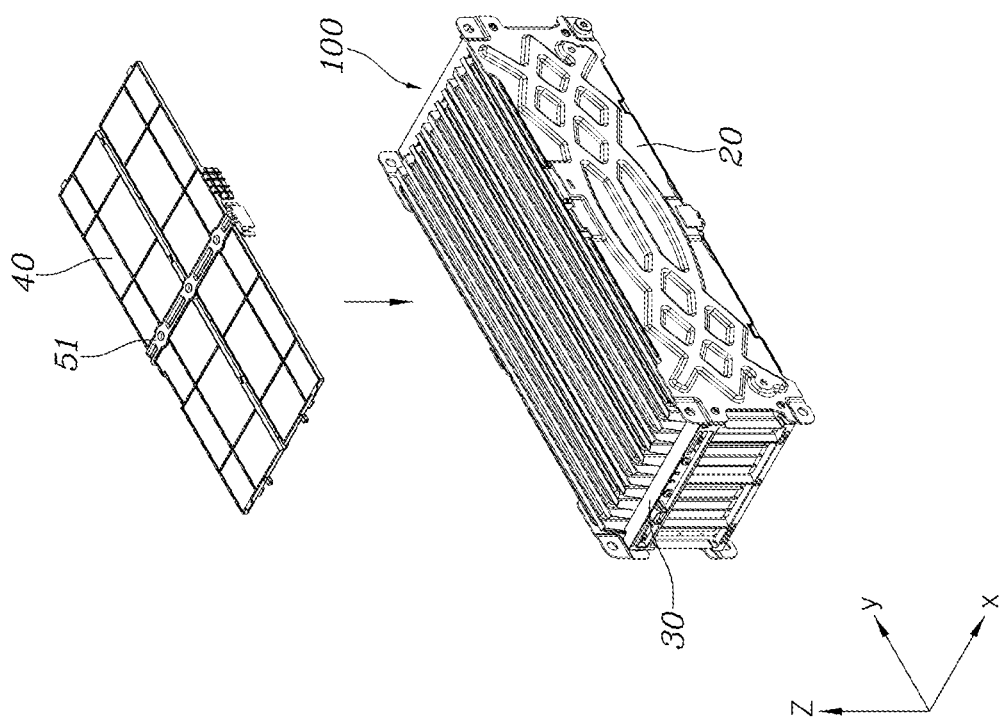

FIG. 12 is a perspective view showing the position relationship of a stacked structure and a cover, a first clamp, and a second clamp of a battery module according to one form of the present disclosure.

As shown in FIG. 12, the first cover 40 may be disposed at an end of the stacked structure 100 in the third direction of the battery cell-stacked structure 100.

The first clamp 51 having a bar shape extending in the first direction may be disposed across the stacked structure 100 at the outside of the first cover 40, and both ends of the first clamp 51 may be respectively bonded to the pair of end plates 20.

The second clamp 52 having a bar shape extending in the first direction may be disposed across the stacked structure 100, adjacent to a second surface facing a first surface of the stacked structure 100 on which the first cover 40 is disposed, and both ends of the second clamp 52 may be respectively bonded to the pair of end plates 20.

The first clamp 51 may be fixed to the first cover 40 by thermal bonding, etc., and both ends thereof are respectively bonded to the two end plates 20, thereby being able to maintain the distance between the two end plates 20 even though the battery cells 110 swell. Further, the second clamp 52 is disposed adjacent to the exposed surface (the bottom in the figures) of the stacked structure 100, thereby, similar to the first clamp 51, being able to maintain the distance between the two end plates 20 even though the battery cells swell.

Figure 13:
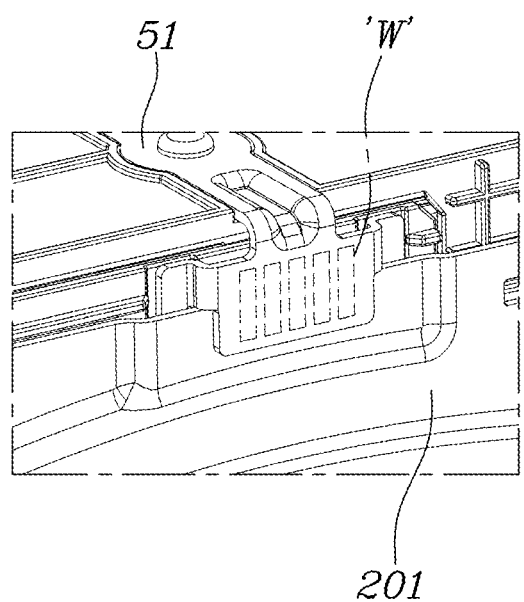
FIG. 13 is a view showing an end of the first clamp shown in FIG. 12.

FIG. 13 is a view showing an end of the first clamp shown in FIG. 12.

As shown in FIG. 13, an end of the first clamp 51 may have a hook-like structure bent toward the end plate 20 and the bent end may face the outer surface of the end plate 20. The bent end is welded to the outer surface adjacent to a side of the end plate 20 (W: welded region), thereby being able to be fixed to the end plate 20. The coupling structure shown in FIG. 11 can be applied to the second clamp 52 in the same way.

As described above, the first clamp 51 is bonded to a side (the upper side in the figures) of each of the two end plates 20 and the second clamp 52 is bonded to each of large sides (the lower side in the figure) opposite the sides of the two end plates 20 to which the first clamp 51 is bonded, thereby maintaining the distance between the two end plates at the centers of the end plates in the second direction. Accordingly, rigidity provided by the end plates can act on the battery cells disposed inside the end plates.

Figure 14:
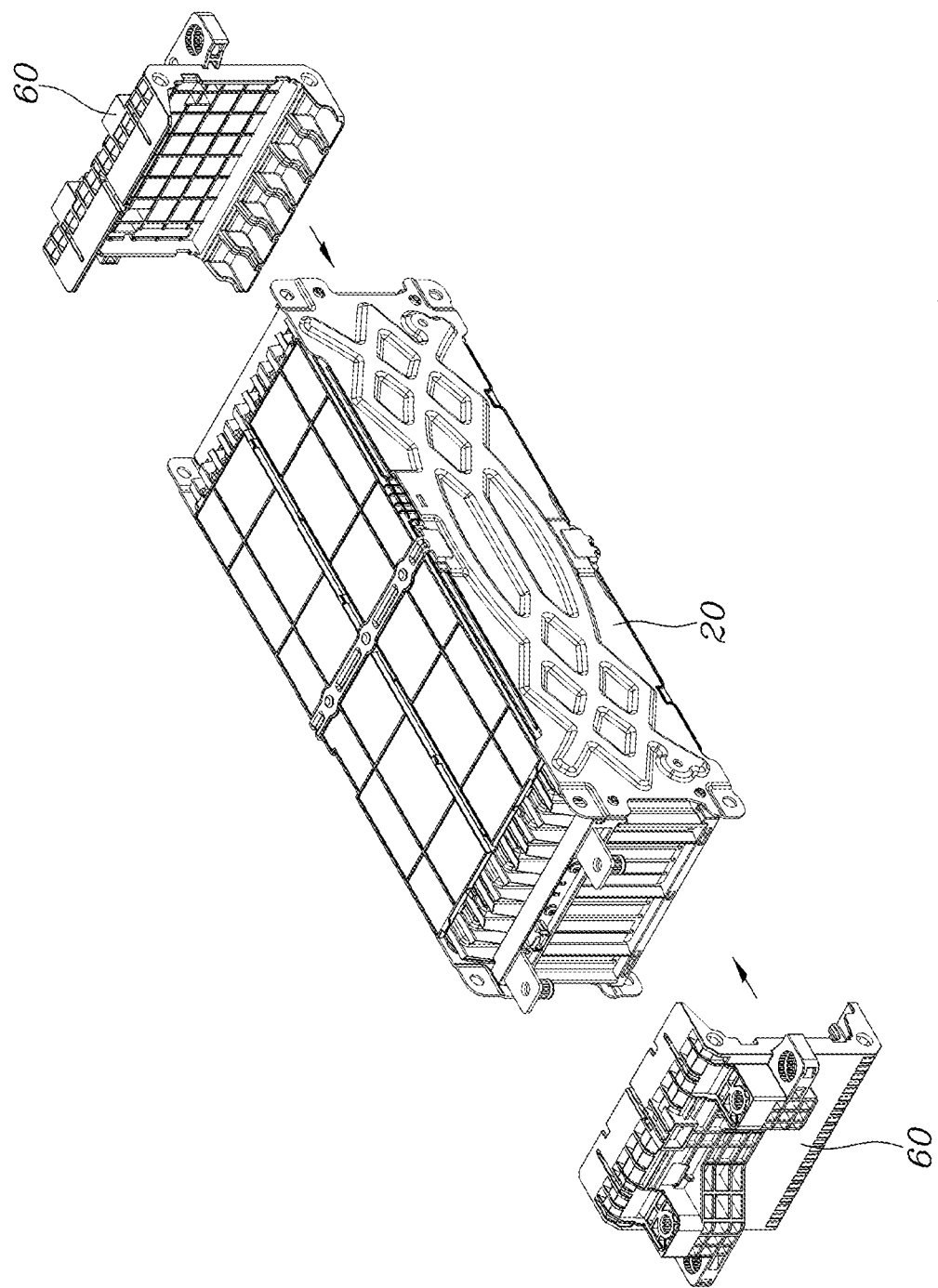
FIG. 14 is a perspective view showing the position relationship of a stacked structure and second and third covers of a battery module according to one form of the present disclosure.

FIG. 14 is a perspective view showing the position relationship of a stacked structure and second and third covers of a battery module according to one form of the present disclosure.

As shown in FIG. 14, the second and third covers 60 may be respectively disposed at both ends of the stacked structure 100 in the second direction perpendicular to the stacking direction of the battery cell-stacked structure 100, that is, in the direction in which the electrodes 111a, 111b of the battery cells 110 are connected. The second and third covers 60 are substantially the same components disposed at symmetric positions on the battery module 10, so they are given the same reference numeral.

By installing the second and third covers 60, the bus bar assemblies 30 are covered and the battery module 10 can be finally completed. The second and third covers 60 may have through-holes that can exposed components that are supposed to be exposed out of the battery module (e.g., portions of the bus bars supposed to be exposed for electrical connection with the outside, a connector for providing information obtained by detecting cell voltages, etc.) of the components of the bus bar assemblies 30.

Figure 15:
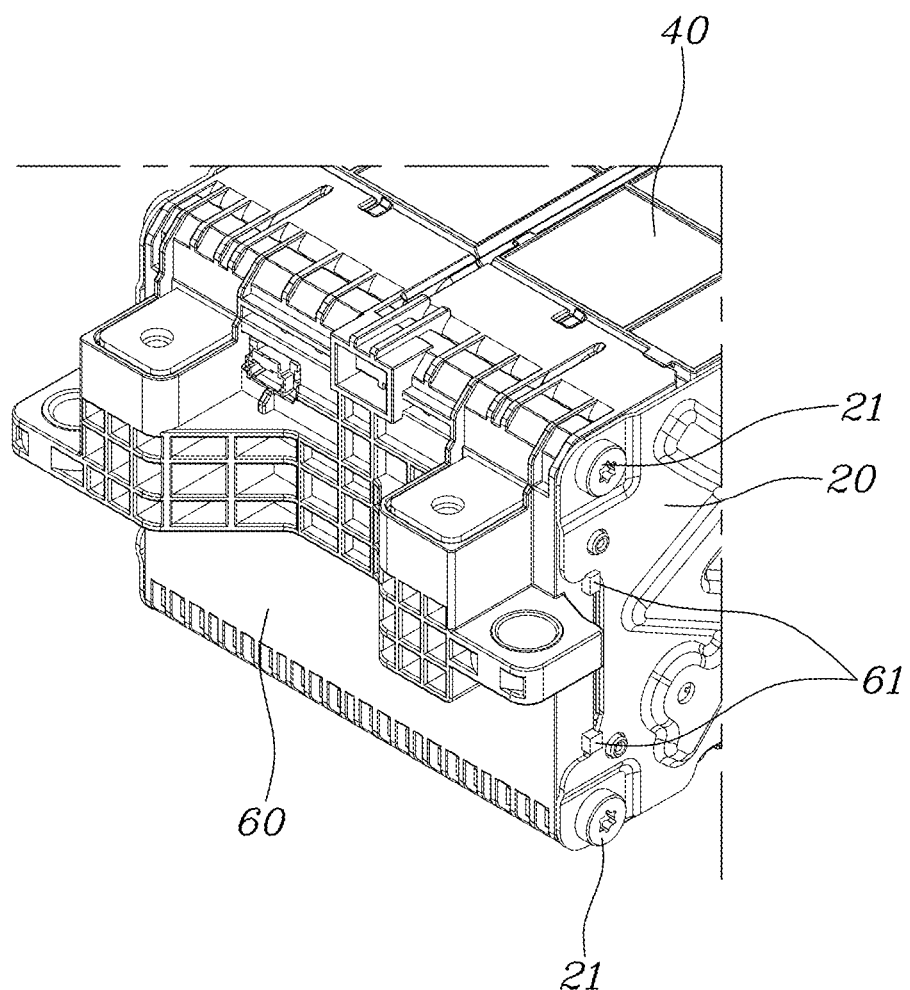
FIG. 15 is a view showing in detail an assembly structure of the second cover and the third cover of a battery module according to one form of the present disclosure.

FIG. 15 is a view showing in detail an assembly structure of the second cover and the third cover of a battery module according to one form of the present disclosure.

As shown in FIG. 15, side surfaces of the second and third covers 60 may be in contact with the end plates 20. The end plates 20 and the side surfaces of the second and the third cover 60 may be coupled to each other by bolts 21. Though not shown, the two end plates 20 may be fastened by bolts 21 fastened at both ends of a long nut disposed inside the cover 60.

Further, locking protrusions 61 protruding in the first direction may be formed on the side surfaces of the second cover and the third cover 60 and the edges of the end plates 20 are locked to the locking protrusions 61, whereby the covers and the end plates can be locked to each other in the assembly.

Figure 16:
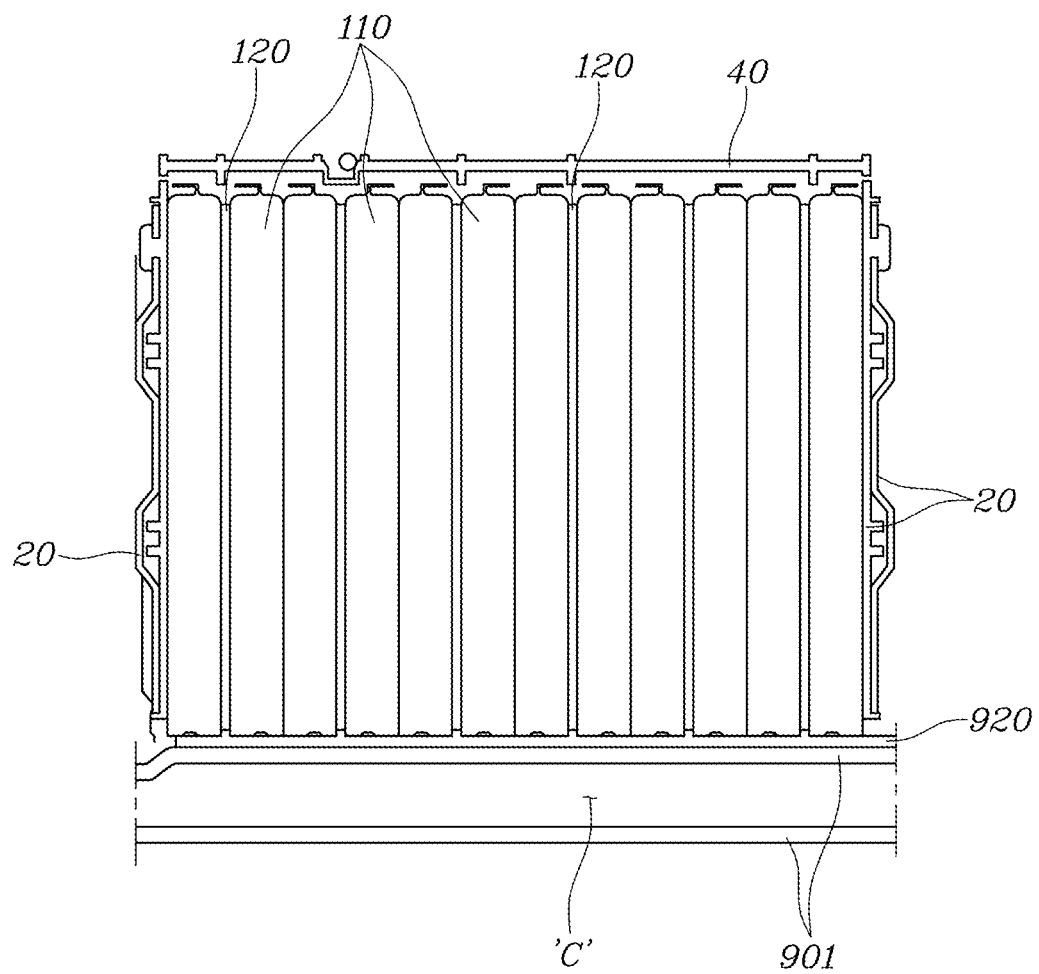
FIG. 16 is a cross-sectional view showing a portion of a battery pack in which a battery module according to one form of the present disclosure is seated.

FIG. 16 is a cross-sectional view showing a portion of a battery pack in which a battery module according to one form of the present disclosure is seated.

As shown in FIG. 16, the battery pack 10 according to one form of the present disclosure may be mounted in a case 901 of a battery pack. The bottom of the case 901 of the battery pack may be the seat surface on which the battery module 10 is seated.

As described above, the battery module 10 according to one form of the present disclosure has a structure in which the battery cell 110 is exposed without a specific cover on a surface in the third direction. The battery module 10 may be seated in the battery pack such that the surface on which the battery cells 110 are exposed faces the seat surface. When the battery module is seated, a gap filler 920 is provided between the seat surface of the case 901 of the battery pack and the exposed battery module, thereby being able to indirectly bring the battery cells 110 of the battery module 10 and the seat surface of the case 901 in indirect contact with each other.

The gap filler 920 may be a thermal interface material that can transmit heat generated by the battery cells 110 to the case 901. The battery cells 110 and the seat surface (bottom) of the case 901 are in contact with each other without any interference by the gap filler 920, so the heat generated by the battery cells 110 can be more easily discharged.

A cooling channel C through which cooling water can flow is formed in the region under the battery module seat surface of the case 901 of the battery pack, so the effect of discharging the heat generated by the battery cells 110 can be further improved.

As described above, in the battery module according to various forms of the present disclosure and the battery pack including the battery module, clamps are welded to end plates at both sides at the center of battery module in the direction in which battery cells are stacked, and the end plates are bolted to covers at both ends, whereby it is possible to provide sufficient rigidity.

Further, in the battery module according to various forms of the present disclosure and the battery pack including the battery module, since it is possible to implement electrical connection between electrodes of a plurality of stacked battery cells through one bending process and one welding process by employing bus bar assemblies, it is possible to improve the quality of the product by simplifying processes and removing resultant differences between battery cells.

Further, in the battery module according to various forms of the present disclosure and the battery pack including the battery module, since the battery cells forming the battery pack are manufactured in a module type, it is possible to apply standardized battery cells to battery packs having several specifications even if the specification of a battery pack is changed in accordance with the kinds of vehicles. Accordingly, it is possible to remove a specific designing process for disposing battery cells in a battery pack, so it is possible to reduce the development period and the development cost.

Further, in the battery module according to various forms of the present disclosure and the battery pack including the battery module, since the battery cells in the battery module can be in contact with the seat surface of the case of the battery pack through the gap filler without any interference, it is possible to more effectively discharge the heat generated by the battery cells.

Although the present disclosure was described above with reference to specific embodiments, it would be apparent to those skilled in the art that the present disclosure may be changed and modified in various ways within the claims.

What is claimed is:

1. A battery module comprising:
    a plurality of battery cells stacked on each other in a first direction and forming a stacked structure;
    a pair of end plates respectively being in surface contact with a first end and a second end of the stacked structure in the first direction;
    a pair of bus bar assemblies disposed, respectively, at third and fourth ends of the stacked structure in a second direction perpendicular to the first direction, and configured to bond electrodes of the plurality of battery cells respectively disposed at the third and fourth ends of the stacked structure in the second direction;
    a first cover covering a first surface of the stacked structure in a third direction perpendicular to the first direction and the second direction;
    a first clamp including a first end and a second end respectively bonded to the pair of end plates across an outside surface of the first cover, wherein the first clamp is disposed at a center of the first surface of the stacked structure relative to the second direction; and
    a second clamp including a first end and a second end respectively bonded to the pair of end plates across a second surface, which faces the first surface, of the stacked structure, wherein the second clamp is disposed at a center of the second surface of the stacked structure relative to the second direction,
    wherein bonding locations of the first clamp and the second clamp are respectively disposed at a center portion of the pair of end plates relative to the second direction so as to maintain a distance between the pair of end plates when a battery cell of the plurality of battery cells swells,
    wherein each end plate of the pair of end plates includes:
        an inner plate made of an insulating material and being in surface contact with the stacked structure; and
        an outer plate covering the inner plate and having rigidity greater than rigidity of the inner plate, and
    wherein the outer plate is disposed apart from the stacked structure at a predetermined distance at an end adjacent to the first cover, and defines an insertion space configured to receive a temperature sensor.

2. The battery module of claim 1, further comprising a second cover and a third cover covering the pair of bus bar assemblies, respectively, in the second direction.

3. The battery module of claim 1, wherein the stacked structure includes a plurality of cell assemblies stacked in the first direction, and each cell assembly of the plurality of cell assemblies includes a pair of battery cells stacked with a surface pressure pad disposed therebetween.

4. The battery module of claim 3, wherein the pair of battery cells of the cell assembly are stacked such that electrodes having the same polarity are disposed adjacent to each other.

5. The battery module of claim 3, wherein the plurality of cell assemblies of the stacked structure are stacked such that electrodes having different polarities are disposed adjacent to each other.

6. The battery module of claim 3, wherein the plurality of cell assemblies are stacked with a hot melt disposed therebetween.

7. The battery module of claim 1, wherein each bus bar assembly of the pair of bus bar assemblies includes a bus bar including a plurality of slits, and
the electrodes include bending regions that pass through the plurality of slits and are bonded to the bus bar.

8. The battery module of claim 1, wherein each bus bar assembly of the pair of bus bar assemblies includes a circuit configured to detect voltages of the plurality of battery cells.

9. The battery module of claim 1, wherein the first clamp is attached to the first cover, and
the first and second ends of the first clamp are bent, face the pair of end plates, and are bonded to outer surfaces of the pair of end plates.

10. The battery module of claim 1, wherein the first and second ends of the second clamp are bent, face the pair of end plates, and are bonded to outer surfaces of the end plates.

11. A battery pack comprising:
a battery module including:
a plurality of battery cells stacked on each other in a first direction and forming a stacked structure,
a pair of end plates being in surface contact with a first end and a second end of the stacked structure in the first direction,
a pair of bus bar assemblies disposed, respectively, at third and fourth ends of the stacked structure in a second direction perpendicular to the first direction, and bonding electrodes of the plurality of battery cells respectively disposed at the third and fourth ends of the stacked structure in the second direction,
a first cover covering a first surface of the stacked structure in a third direction perpendicular to the first direction and the second direction,
a first clamp including a first and a second ends respectively bonded to the pair of end plates across an outside surface of the first cover, wherein the first clamp is disposed at a center of the first surface of the stacked structure relative to the second direction so as to maintain a distance between the pair of end plates even when a battery cell of the plurality of battery cells swells, and
a second clamp including a first and a second ends respectively bonded to the pair of end plates across a second surface, which faces the first surface, of the stacked structure, wherein the second clamp is disposed at a center of the second surface of the stacked structure relative to the second direction so as to maintain a distance between the pair of end plates even when the battery cell swells;
a case including a seat surface on which the battery module is seated; and
a gap filler disposed between the stacked structure and the seat surface,
wherein one side of the battery module is open through which a second surface of the stacked structure disposed opposite to the first surface is exposed, and the exposed second surface and the seat surface face to each other,
wherein each end plate of the pair of end plates includes:
an inner plate made of an insulating material and being in surface contact with the stacked structure; and
an outer plate covering the inner plate and having rigidity greater than rigidity of the inner plate, and
wherein the outer plate is disposed apart from the stacked structure at a predetermined distance at an end adjacent to the first cover, and defines an insertion space configured to receive a temperature sensor.

12. The battery pack of claim 11, wherein the case further includes a cooling channel, through which cooling water flows, under the seat surface.

13. The battery pack of claim 11, wherein the battery module further includes a second cover and a third cover respectively covering the pair of bus bar assemblies in the second direction.

14. The battery pack of claim 11, wherein each bus bar assembly of the pair of bus bar assemblies includes a bus bar including a plurality of slits, and
the electrodes include bending regions that pass through the plurality of slits and are bonded to the bus bar.

15. The battery pack of claim 11, wherein the bus bar assembly includes a circuit detecting voltages of the plurality of battery cells.

16. The battery pack of claim 11, wherein the first clamp is attached to the first cover,
the first and second ends of the first clamp are bent, face the pair of end plates, and are bonded to outer surfaces of the pair of end plates, and
the first and second ends of the second clamp are bent, face the pair of end plates, and are bonded to the outer surfaces of the pair of end plates.

* * * * *